Patented Oct. 26, 1937

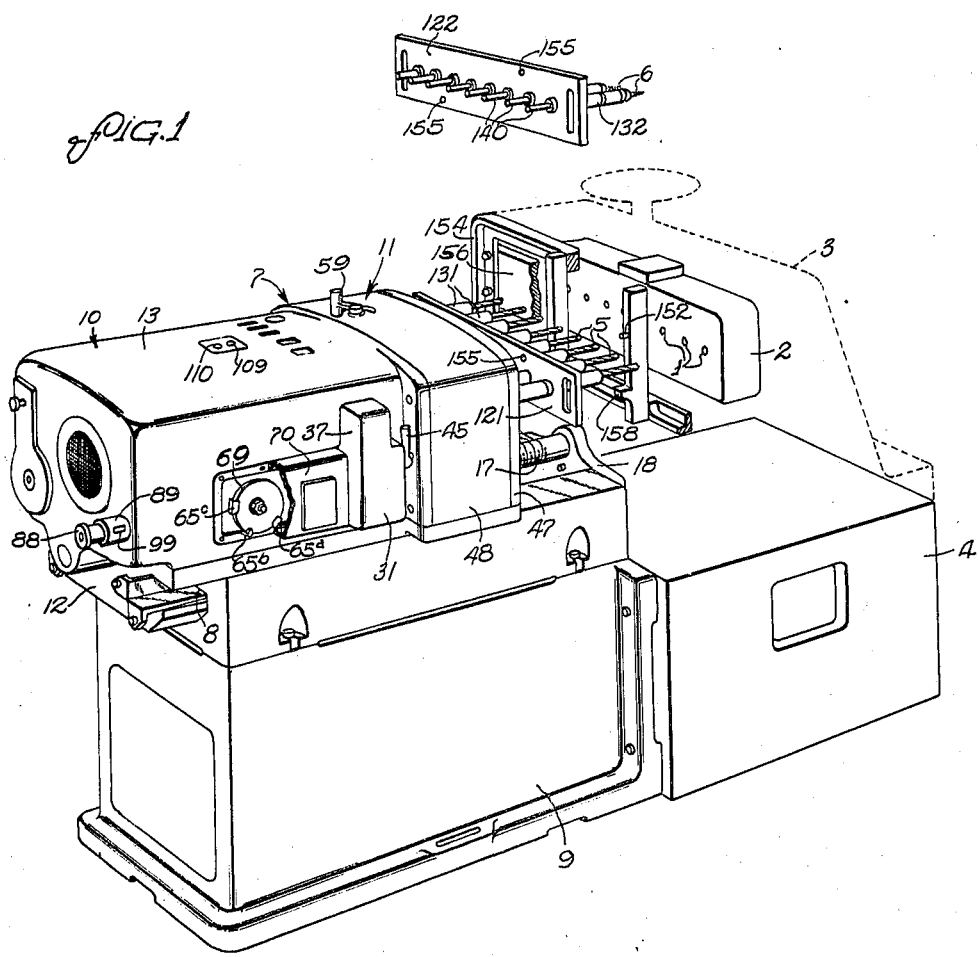

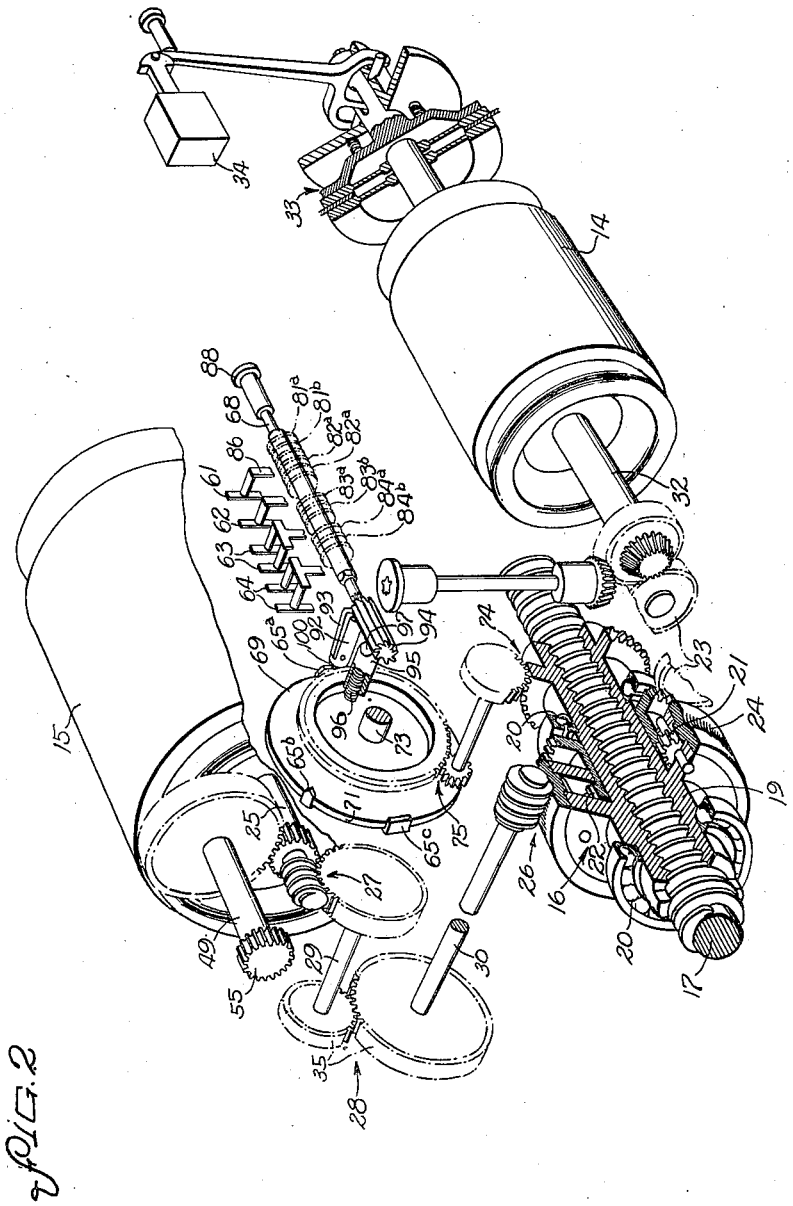

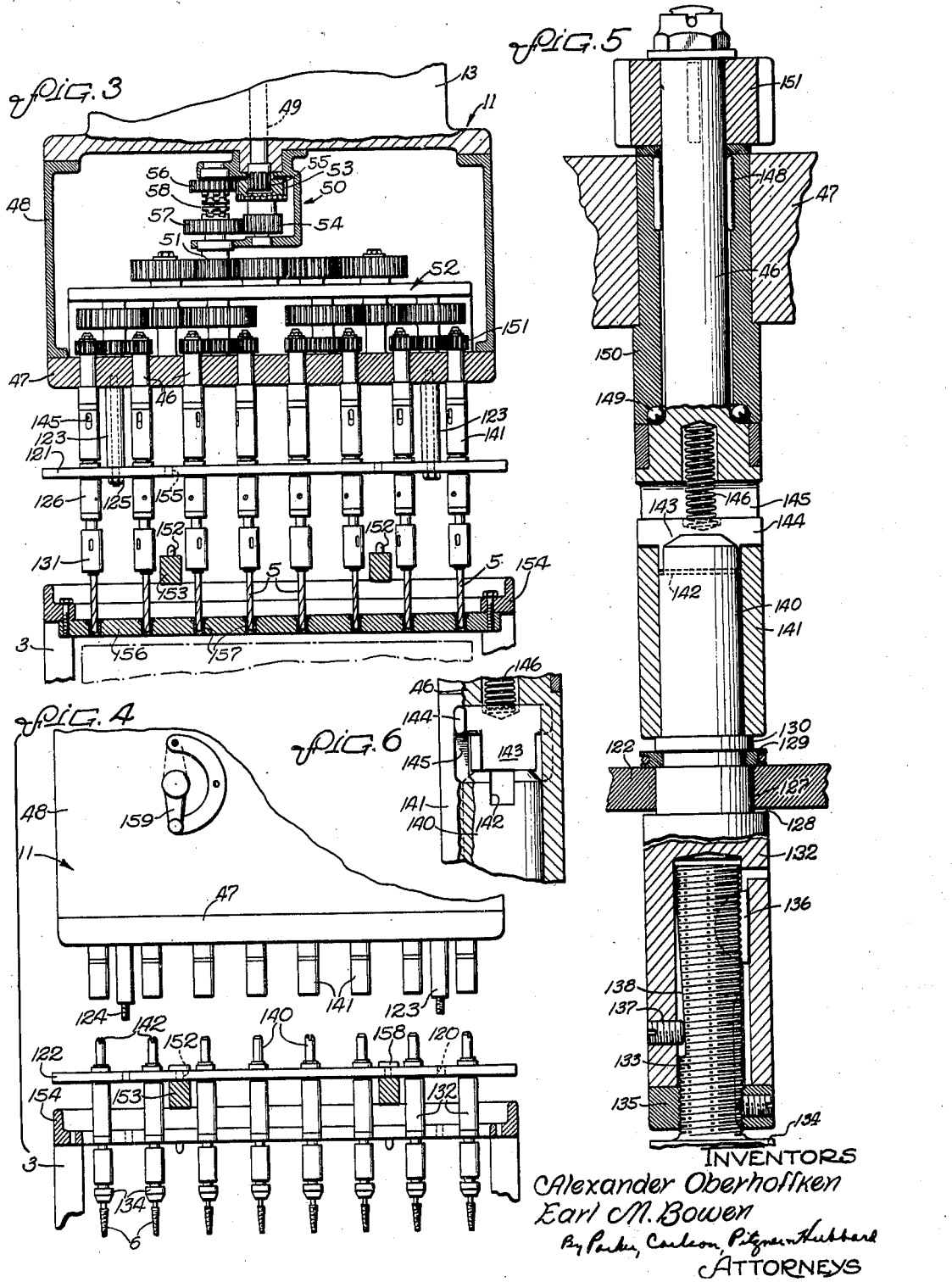

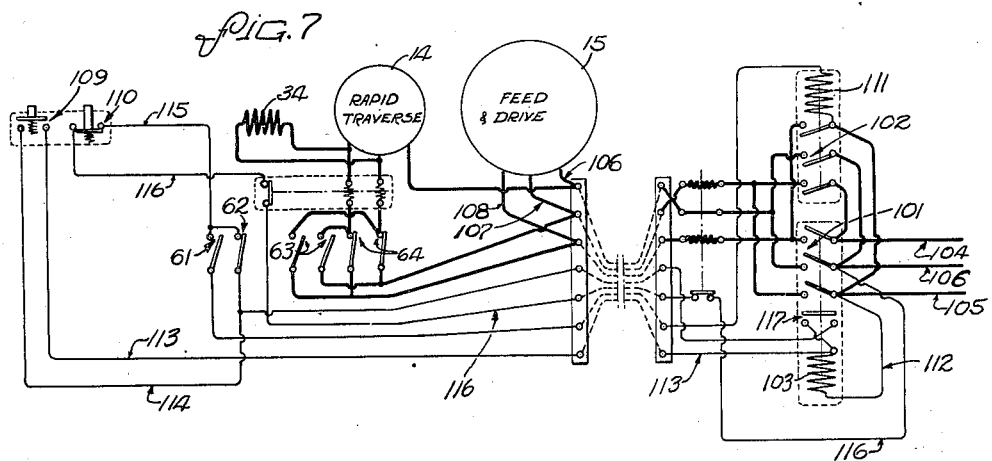
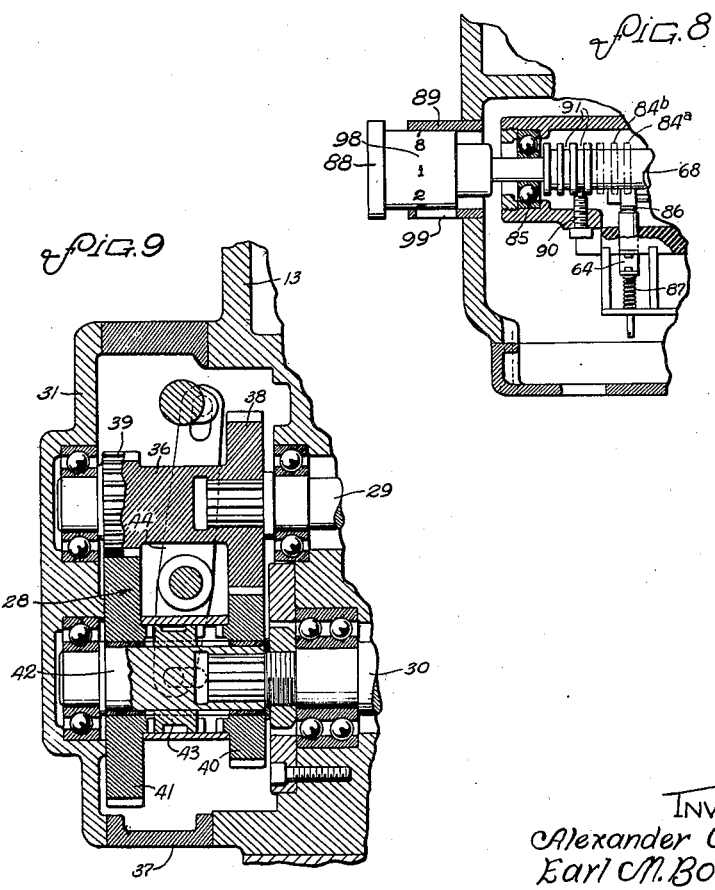

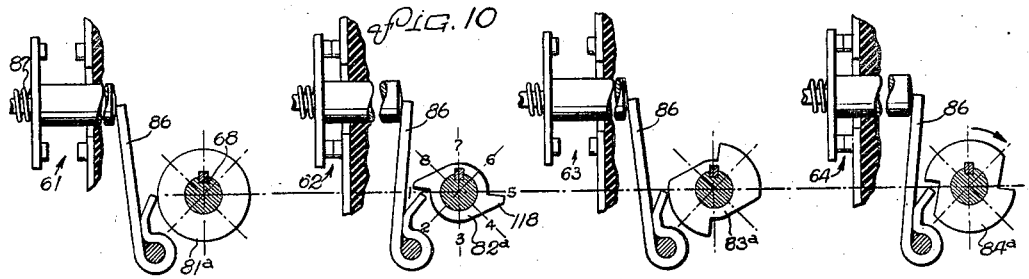
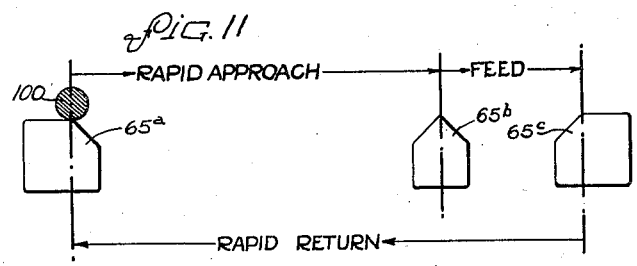
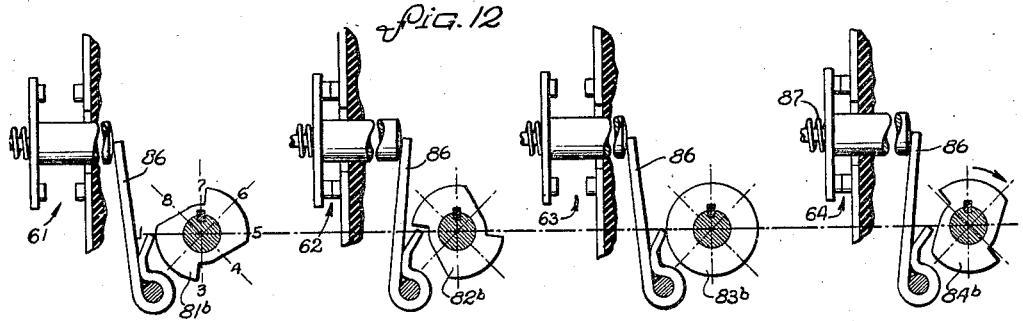
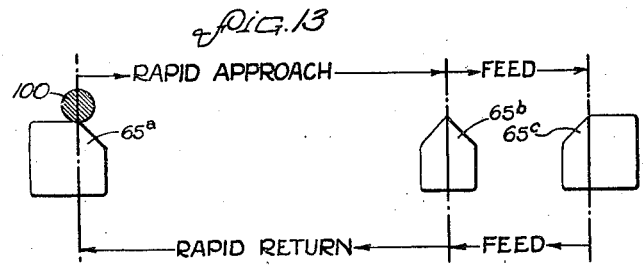

2,096,754

UNITED STATES PATENT OFFICE 2,096,754

MACHINE TOOL

Alexander Oberhoffken and Earl M. Bowen, Rockford, Ill., assignors to The Ingersoll Milling Machine Company, Rockford, Ill., a corporation of Illinois Application February 18, 1935, Serial No. 6,980

2 Claims. (Cl. 77—22)

This invention relates to machine tools for performing various metal-removing processes such as drilling, milling, tapping, boring, reaming, etc. and has more particular reference to machine tools of the multiple spindle type for forming or machining a series of holes in a work piece.

In practice, it frequently happens that a number of holes spaced in a predetermined relation must be drilled or bored in a work piece and afterwards the same holes must be tapped or otherwise finished. Where production requirements permit, a substantial saving of capital investment in machinery may be effected by performing several of such operations in one machine tool.

The primary object of the present invention is to provide a novel tool head construction by which conversion of a machine tool or the performance of any one of several different material-removing processes may be facilitated.

Other objects and advantages of the invention will become apparent from the following detailed description taken in connection with the accompanying drawings, in which—

Figure 1 is a perspective view of a machine tool embodying the features of the present invention.

Fig. 2 is a perspective view of the power mechanism and the drive connections extending therefrom.

Fig. 3 is a fragmentary view of the tool unit and work fixture with certain of the parts broken away or shown in section.

Fig. 4 is a view similar to Fig. 3 with one set of tools removed from the tool head.

Fig. 5 is a sectional view through a spindle supporting one of the tapping tools.

Fig. 6 is a fragmentary sectional view of the coupling for connecting one of the tool spindles to its drive shaft.

Fig. 7 is a wiring diagram.

Fig. 8 is a fragmentary sectional view of a portion of the cycle controlling mechanism.

Fig. 9 is a fragmentary sectional view showing a form of speed change mechanism for use in the feed driving connection.

Figs. 10 and 12 show the construction of the cams for defining different operating cycles.

Figs. 11 and 13 show the arrangement of the control dogs for different operating cycles.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For the sake of simplicity in illustration, the invention is shown in the drawings as embodied in a horizontal one way machine tool of the multiple spindle type for drilling a plurality of holes 1 in a work piece 2 and tapping the same holes. While being operated upon, the work piece is suitably clamped in a fixture indicated in outline at 3 and mounted on a pedestal 4. In the exemplary machine shown, the tools, which may be drills 5 or taps 6, are rotatably supported by a unitary head 7 which is arranged to slide bodily along parallel ways 8 on a machine bed 9. The head herein shown comprises a self-contained power unit 10 and a separate demountable tool or spindle carrying unit 11 both mounted on a saddle or carriage 12 having surfaces complemental to and fitting slidably in guideways 8.

In the form shown, the power unit 10 is of the electric type and comprises generally a casing 13, a reversible electric motor 14 (Fig. 2) therein for imparting rapid traverse motions to the tool head and a reversible electric motor 15 for imparting positive feed motions in opposite directions to the head and also for rotating the tools in synchronism with the feed motions.

The rotary motion produced by operation of the motors 14 and 15 either simultaneously or independently is combined by a differential gearing 16 and converted into bodily rectilinear motion of the saddle 12 by two relatively rotatable feed elements which preferably comprise a screw 17 stationarily anchored to a plate 18 (Fig. 1) on the machine bed and a nut 19 threading onto the screw and rotatably mounted in the lower portion of the casing 13 in which the nut is rotatably mounted and held against axial movement by bearings 20. The nut carries the planet gears 21 of the differential, the sun gear 22 of which is driven through appropriate gearing 23 from the shaft of the rapid traverse motor 14. The ring gear 24 is connected to the shaft 25 of the feed motor 15 by worm gearing 26 and 27 and speed change gearing 28 connecting two cross shafts 29 and 30. The ends of the latter terminate adjacent one side of the casing 13 so that they may be exposed by removal of a detachable cover 31.

It will be observed that the nut 19 may be rotated by operation of either of the motors 14 and 15, and that it will be advanced along the screw in a direction and at a speed corresponding to that of the operating motor thereby causing corresponding motion of the tool head 7 as a unit. When the feed motor alone is operating, the shaft 32 of the rapid traverse motor is held against rotation by a spring applied friction brake 33 arranged to be released by a solenoid 34 which is energized whenever the rapid traverse motor is excited.

The speed change gearing 28 provides a means by which the rate of feed of the tool head may be varied for the performance of different metal-removing processes at optimum efficiency. For certain applications, this gearing may take the form of pick-off gears 35 (Fig. 2) removably attached to the outer ends of the shafts 29 and 30. Or, where a quicker change of the feed rate is desirable, a clutch-controlled speed change gearing may be employed. As shown in Fig. 9, such gearing may comprise a drive shaft 36 coupled to the shaft 29 within a housing 37 and having fast thereon gears 38 and 39 of different sizes which mesh with gears 40 and 41 loose on a shaft 42 coupled to the shaft 30. Splined on the latter is a toothed collar 43 adapted by actuation of a lever 44 to be shifted selectively into engagement with teeth on either of the gears 40 and 41 to establish high and low speed driving ratios respectively between the shafts 29 and 30. Through the medium of a suitable eccentric (not shown), the lever 44 may be swung from one of said positions to the other by means of a handle 45 disposed externally of the gear housing 37.

As will more fully appear later, the tools carried by the head 7 are mounted on spindles or shafts 46 (Fig. 3) projecting from a face plate 47 closing the forward end of the housing 48 of the tool unit 11. The spindles 46 are journaled in the face plate with their axes located accurately according to the space of the holes to be formed.

To produce proper synchronism between the rotation of the tools and the axial feed thereof so as to enable tapping operations to be performed, the drive shafts 46 are driven from the feed motor 15. For this purpose, the motor shaft 25 is geared to a shaft 49 which extends through the forward end of the casing 13 into the housing 48 where the shaft is connected by a selectively adjustable speed reducing mechanism 50 (Fig. 3) to a shaft 51 which, through appropriately designed gearing 52, drives the tool drive shafts at the proper relative speeds.

The speed reduction mechanism 50 comprises two gears 53 and 54 of different sizes coupled to a pinion 55 on the end of the shaft 49 and meshing with gears 56 and 57 which are loose on the shaft 51 and arranged to be engaged selectively by an axially shiftable clutch collar 58 splined on the shaft. Through appropriate connections (not shown) and a handle 59 (Fig. 1) disposed exteriorly of the housing 48, the collar may be shifted to establish selectively a high or low speed drive ratio for the tools.

It is contemplated that the mechanisms 28 and 50 will be so constructed that when the feed change mechanism 28 is set for its low driving ratio and the mechanism 50 is set for high speed, the proper tool drive and feed ratios for the drilling operation will be established. Similarly, the proper ratios for efficient tapping will be obtained when the mechanisms 28 and 50 are set for the high feed and the low tool drive ratios. In this way, the common drive mechanism may be conditioned for drilling or for tapping operations simply by adjustment of the levers 45 and 59 which, if desired, may be arranged for operation by a common actuating element.

Through the use of the single drive mechanism arranged for adjustment in the manner described to vary the rates of feed and tool drive, a single control mechanism may be employed for governing the motors 14 and 15 to define automatically either a normal drilling cycle comprising rapid approach, feed and rapid return motions of the tool head 7 or a tapping cycle comprising rapid approach, feed, reverse feed and rapid return motions.

In the form shown, the control mechanism comprises generally a series of switches 61, 62, 63, and 64 governing the motor circuits and operated selectively by a series of relatively adjustable dogs 65ª, 65ᵇ, and 65ᶜ spaced according to the lengths of the different paths of the cycles to be performed. Preferably the dogs operate to control the switches through the medium of a selector element 68 which is advanced unidirectionally with a step-by-step motion through a plurality of different positions in which the switches are conditioned for producing the different feed and rapid traverse motions.

Herein the dogs, which operate to determine the points in the movement of the tool head 7 at which different parts of a cycle are initiated and terminated, are carried by and spaced around a rotatable disk 69 positioned in the casing 13 so as to be exposed upon removal of a cover plate 70. The dogs project parallel to the axis of the disk and are shaped to straddle a flange 71 to which they are adjustably clamped. The disk is detachably mounted on the end of a shaft 73 and is driven from the feed nut 19 through pairs of gears 74 and 75.

Preferably, the selector element 68 which operates the switches to determine the character of the different parts of each machine cycle is in the form of a cam shaft rotatably supported within the casing 13 and carrying a set of cams 81ª, 82ª, 83ª and 84ª adapted to operate the switches 61, 62, 63, and 64 to define a drilling cycle and a second set of cams 81ᵇ, 82ᵇ, 83ᵇ, and 84ᵇ for defining a tapping cycle. In the present instance, the sets of cams are rendered operative selectively by shifting the cam shaft 68 axially in its bearings 85 so as to bring one or the other set of cams into operative association with pivoted follower arms 86 by which the switches are opened against the action of individual springs 87 which tend to maintain the switches closed.

The cams and followers are so constructed that in at least one angular position, which is the normal starting position in the present instance, the cam shaft is free to move axially. To facilitate such movement, one end of the cam shaft is coupled to a knob 88 journaled in an outwardly projecting flange 89 and operable from a point exteriorly of the casing 13. By retracting a set screw 90 (Fig. 8) to withdraw it from an annular locking groove 91 in the cam shaft, the latter may, by manipulation of the knob 88, be shifted axially to bring the other set of cams into operative association with the followers 86 and thereby condition the control mechanism for execution of a different cycle.

A row of numbers 98 are marked on the knob 88 within the flange 89 so that the cam shaft position may be determined by observing the number which is exposed by an elongated opening 99 in the flange. When the shaft is set for the drilling cycle, the numbers will be disposed near the outer end of the opening 99 as shown in Fig. 8. The numbers are opposite the inner end of the opening when the shaft is set for execution of a tapping cycle. These axial positions of the cam shaft may be indicated by suitable legends marked along the slot 99 on the outer surface of the flange 89.

A ratchet mechanism preferably of the mechanical type is employed for advancing the selector shaft 68 one step each time one of the dogs moves past a predetermined operating position. This mechanism includes a plunger 92 (Fig. 2) mounted for endwise reciprocation and carrying at one end a roller 100 in the path of the dogs and carrying a pawl 93 which operates on the teeth of an elongated ratchet wheel 94 splined onto the inner end of the cam shaft 68. A second plunger 95 is urged into engagement with the ratchet wheel by a spring 96 so that after the pawl 93 has moved the ratchet wheel through a predetermined part of one step, the tapered end 97 of the plunger 95 will ride over center with respect to one of the ratchet teeth and act as a cam thereon to complete the step of movement with a snap action. The cams are shaped to operate their switches in this rapid portion of the cam shaft movements.

As shown in the exemplary wiring diagram (Fig. 7), the switches 61 and 62 operate through the medium of magnetic relay switches 101 and 102 to control the feed motor 15. Energization of the coil 103 of the relay switch 101 closes switches which connect the power leads 104, 105, and 106 to conductors 107, 108, and 109 in a manner such as to cause operation of the feed motor in a direction to move the tool head toward the work. Similarly, energization of the coil 111 of the relay switch 102 connects the feed motor to the power leads in a manner such as to cause reverse rotation of the motor and retraction of the tool head away from the work. The switches 63 and 64 are arranged to connect the motor 14 to the conductors 107 and 108 so that whenever the relay 101 is energized, closure of the switches 64 and 63 will cause the motor 13 to produce rapid approach and rapid return motions respectively. When the relay 102 is energized, rapid return of the tool head will be produced by closure of the switch 64. Starting of each cycle and interruption of the motor operation at any point therein are controlled by normally open and normally closed switches 109 and 110 respectively.

With the levers 45 and 59 and the cam shaft 68 set for the drilling cycle, the operation is as as follows, the switches being conditioned by their cams as shown in Fig. 10 and the follower roller 100 being in engagement with the dog 65ª as indicated in Fig. 11. The cycle is started by closure of the start switch 109 which completes an energizing circuit for the relay coil 103 extending from the power conductor 105 through a conductor 112, the coil 103, a conductor 113, the switch 109, a conductor 114, the then closed switch 62, a conductor 115, the then closed stop switch 110, a conductor 116 to the power line 106. Closure of the relay switch 101 applies current to the feed motor 15, and since at this time the switches 64 are also closed, the motor 13 will also be started, rapid approach movement of the tool head being produced by the combined operation of the two motors. Closure of a switch 117 of the relay 101 establishes a locking circuit for the coil 103 including the stop switch 110.

In the first stepping movement of the cam shaft 68 during which the latter is advanced one eighth of a revolution and which occurs when the dog 65ᵇ actuates the plunger 92, a lobe on the cam 84ª opens the switch 64 thereby interrupting the operation of the rapid traverse motor whereupon the feed motor continues to drive the tool and advance the same into the work at the proper speed for drilling. When the dog 65ᶜ becomes effective to advance the cam shaft in its second stepping movement, the follower controlling the switches 63 rides off from a lobe on the cam 83ª allowing these switches to close starting the rapid traverse motor. During the ensuing rapid return movement of the tool head, the dog 65ᵇ causes a third or idle advance of the cam shaft 68 without changing the condition of the control switches so that the return of the head continues until the cam shaft is moved to its fourth position by the dog 65ª. In this advance, the follower of the cam 82ª rides over a short lobe 118 to open the switch 62 momentarily thereby interrupting the locking circuit for the relay coil 103 so as to stop the feed and rapid traverse motor but leaving the switch 62 closed and thus conditioned for initiation of the next cycle. In the same advance of the cam shaft, the cam 83ª opens the switches 63 while the cam 84ª allows the switches 64 to close.

For tapping operations, the levers 45 and 59 would be moved to their other positions and the knob 88 shifted to bring the cams 81ᵇ, 82ᵇ, 83ᵇ, and 84ᵇ into operative association with the followers 86. To start the cycle, with the parts positioned as shown in Figs 7, 12 and 13, the switch 109 is closed momentarily causing the relay coil 103 to be energized and the feed and rapid traverse motors to be started in the manner above described. The cam shaft 68 remains stationary as the dog 65ª moves away from the roller 100 and until the roller is engaged and the ratchet plunger is actuated by the dog 65ᵇ. In the ensuing advance of the cam shaft, a lobe on the cam 84ᵇ opens the switches 64 whereupon the operation of the rapid traverse motor is interrupted, tapping of the holes occurring in the continued rotation of the taps and advance of the tool head produced in synchronism by the feed motor 15.

In the second step of movement of the cam shaft which is produced by engagement of the dog 65ᶜ with the roller 100, the follower 86 rides off from a lobe on the cam 81ᵇ allowing the switch 61 to close and a lobe on the cam 82ᵇ opens the switch 62. The relay coil 103 is thus deenergized and the coil 110 is energized thereby reversing the direction of rotation of the feed motor 15 and the dog disk 69. The direction of rotation of the tool is thus reversed and the latter is withdrawn from the work at feed speed.

When the dog 65ᵇ again engages the roller 66 and actuates the ratchet plunger to advance the cam shaft 68 in its third step, the follower for the cam 84ᵇ rides off from a lobe on the latter allowing the switches 64 to close which again initiates the operation of the rapid traverse motor 14. But since the feed motor is now energized through the reverse relay switch 102, the rapid traverse motor runs in the corresponding direction thereby producing rapid return of the tool head. The cycle is terminated automatically in the fourth movement of the cam shaft which is produced by the dog 65ᵃ and in which a lobe on the cam 81ᵇ opens the switch 61 to deenergize the relay coil 110, the switch 62 being allowed to close by the cam 82ᵇ.

In addition to the manual setting of the cycle control mechanism and changing in the tool drive and feed ratios, conversion from a machine for efficiently drilling the holes 1 in the work piece 2 to one for efficiently tapping these holes or vice versa involves a substitution of one set of tools for the other on the tool head 7. To enable this to be accomplished quickly and conveniently in the machine shop, the invention contemplates rotatably mounting the tools of the two sets on carriers 121 and 122 (Figs. 1, 3 and 4) mountable interchangeably on the tool unit 11 for positioning the tools of each set in driving relation with respect to the respective drive spindles, thereby avoiding individual handling or adjustment of each tool in the conversion of the machine.

In the present instance, the carriers are in the form of plates which may, as shown in Fig. 3, be detachably and rigidly secured to the face plate 47 of the tool unit through the medium of a plurality of arms 123 rigid with the face plate and having threaded projections 124 at their ends onto which nuts 125 may be screwed to clamp the carrier rigidly to the arms. Holes 120 through which the projections 124 extend are of sufficient size to permit some degree of lateral shifting of the plate preparatory to clamping of the same to the arms 123 by tightening down the nuts 125.

The drills 5 are carried by individual spindles 126 projecting loosely through recesses 127 in the carrier plate with their axes located according to the spacing of the holes to be drilled. The spindles are held against axial movement relative to the plate by virtue of a shoulder 128 on one side of the plate and a snap ring 129 disposed between the other side of the plate and a shoulder 130. At their lower ends, the spindles are recessed to receive the threaded ends of chucks 131 in which the individual drills are secured.

Spindles 132 mounted in the tap carrier plate 122 are of the same construction as the spindles 126 with their lower ends recessed to receive the threaded shanks 133 of collets 134. The individual taps 6 are supported in the usual way in these collets for a limited degree of axial yielding movement to compensate for any slight inaccuracy in timing between the rotation and axial feed of the taps. Axial setting of each tap is effected by adjustment of a nut 135 threading onto the shank 133 which is held against rotation relative to the spindle by a key 136 and is supported by a set screw 137 entering a tapered slot 138 in the shank.

It will be observed that the tools of each set are at all times supported by their carriers in the same relation as the drive shafts 46 and may be brought into alinement with the latter simply by positioning the carrier. To avoid individual angular adjustment of the tools, provision is made for coupling of the drive shafts 46 to the spindles automatically as an incident to attachment of the carrier plate to the tool unit. This is accomplished by a quickly detachable coupling device having elements respectively mounted on the drive shaft and the corresponding spindle and adapted for positive interengagement in a predetermined angular relation of the drive shaft and the corresponding spindle. One of the elements is free to yield axially to permit of proper attachment of the carrier plate to the head even if the coacting coupling elements are not in exact mating relation and then come into mating engagement with the cooperating coupling element in the initial rotation of the drive shafts 46.

To form the coupling device, the upper reduced end 140 of each spindle 126 and 132 is received in the tubular lower end portion 141 of the drive shaft 46 and is formed with diametrically extending slot 142 which is adapted to receive the correspondingly shaped lower end portion of a coupling bar 143. The latter has arms 144 projecting through the slots 145 in the tubular portion 141 and is urged toward the spindle by a compression spring 146 opposite ends of which are seated in the bar 144 and the lower end of the drive shaft 46. It will be seen that if the bar 143 is not in alinement with the slot 145 when the carrier plate is attached to the tool unit, the bar will engage the end surface of the spindle shank 141ᵃ and slide upwardly as shown in Fig. 6 against the action of the spring 146. Then, in the initial rotary motion of the drive shaft 46, the bar will turn with the shaft and be brought into mating relation with the slot whereupon the bar will be projected into the slot (Fig. 5). A positive driving connection between each tool spindle and its individual drive shaft 46 will thus be established automatically as an incident to the substitution of one set of tools for the other.

In the coupled relation, the shoulder 130 transmits the end thrust on the tools to the drive shaft 46 which herein is supported in anti-friction radial and thrust bearings formed by rollers 148 and balls 149 seated in a bushing 150 which projects through the face plate 47. Pinions 151 by which the shafts 46 are driven from the gearing 52 are splined on the upper ends of the shafts.

Means is provided for facilitating location of the carrier plates on the tool unit 11 preparatory to final clamping of the plates in place. In the present embodiment, this means comprises dowel pins 152 rigid with cross bars 153 on the frame 154 of the work fixture and adapted to be received in holes 155 when the carrier plate is placed on the fixture as shown in Fig. 4 with the thread projections 124 entering the proper holes in the plates.

Assuming that the taps 6 are to be substituted for the drills 5 mounted on the tool head as shown in Fig. 3, the procedure is as follows. After detachment and removal from the fixture of a plate 156 carrying the bushings 157 for guiding the drills 5, the tool head 11 is moved toward the fixture until the carrier plate 121 rests against the bars 153. Then the nuts 125 are removed, the plate 121 being supported by the dowel pins 122 and ledges 158 (Fig. 1) on the bars 153. Next the tool head is retracted, the carrier plate 121 removed and the tap plate 122 placed against the bars 153 as shown in Fig. 4 with the dowel pins 152 entering the holes 155. Then the tool head is advanced to enter the projections 124 through the holes 155 thereby locating the taps relative to the fixture. Complete entry of the spindle shanks 140 into the drive shafts 46 is permitted by yielding of those coupling bars 143 which are not alined with the slots 142. Finally, the nuts 125 are tightened onto the projections 124 to clamp the plate 122 in proper position on the tool head. In the first tapping operation, the couplings between the drive shafts and spindles will be completed as above described.

Removal of the tap carrier and substitution of the drill carrier 121 therefor is effected in a similar manner, the bushing plate 156 being secured to the fixture frame after retraction of the tool head with the drill carrier thereon. In the present instance, the tool carrier, when not in use is removed from the machine proper and stored on or adjacent the machine. In some instances, it is contemplated that the plates 121 and 122 will be attached permanently to the machine and arranged to be swung or shifted into and out of operative position.

We claim as our invention:

1. A multiple spindle machine tool head for facilitating quick interchange of tools thereon comprising, in combination, a gear housing having a wall with laterally spaced spindle openings therein, a series of spindles rotatably supported by said housing to turn about axes extending through said openings and having ends accessible from the exterior of said housing, power driven means within said housing for driving said spindles, a carrier structurally separate from said housing, a plurality of tool-carrying spindle extensions supported by said carrier with their axes spaced for simultaneous alinement with the axes of the respective spindles, and a pair of coupling elements for each spindle respectively mounted on the outer end of the spindle and the adjacent end of the corresponding extension and arranged to interengage in at least one angular relation of the spindle and extension and provide a positive driving connection therebetween when said carrier is moved to a predetermined position opposite said wall with said extensions alined with the respective spindles, one of said elements being mounted to yield and permit full movement of the carrier to said position with the mating elements of certain of said pairs disposed out of said anguler relation whereby to permit of ready separation of said carrier with said extensions thereon from said housing and the substitution of another carrier with similarly spaced tools of different character.

2. A multiple spindle machine tool head for facilitating quick interchange of tools thereon comprising, in combination, a gear housing having a wall with laterally spaced spindle openings therein, a series of spindles rotatably supported by said housing to turn about axes extending through said openings and having ends accessible from the exterior of said housing, power driven means within said housing for driving said spindles, a plurality of spindle extensions each carrying a tool on one end, the other end extensions and the accessible end of one of said spindles being constructed to interfit throughout a substantial distance in telescoping relation and coacting independently of said carrier to effect accurate lateral location of the tools on said extensions, and coacting coupling elements on each spindle and the extension thereof interchangeable in positive driving relation, and a single structurally separate carrier rotatably supporting said extensions with their axes in the same spaced parallel relation as said spindles whereby to permit the spindle extensions to be handled as a unit when detached from said spindles and to be maintained in positions for simultaneous coupling with the respective spindles in the movement of the carrier toward said wall.

ALEXANDER OBERHOFFKEN.
EARL M. BOWEN.